Figure 1:
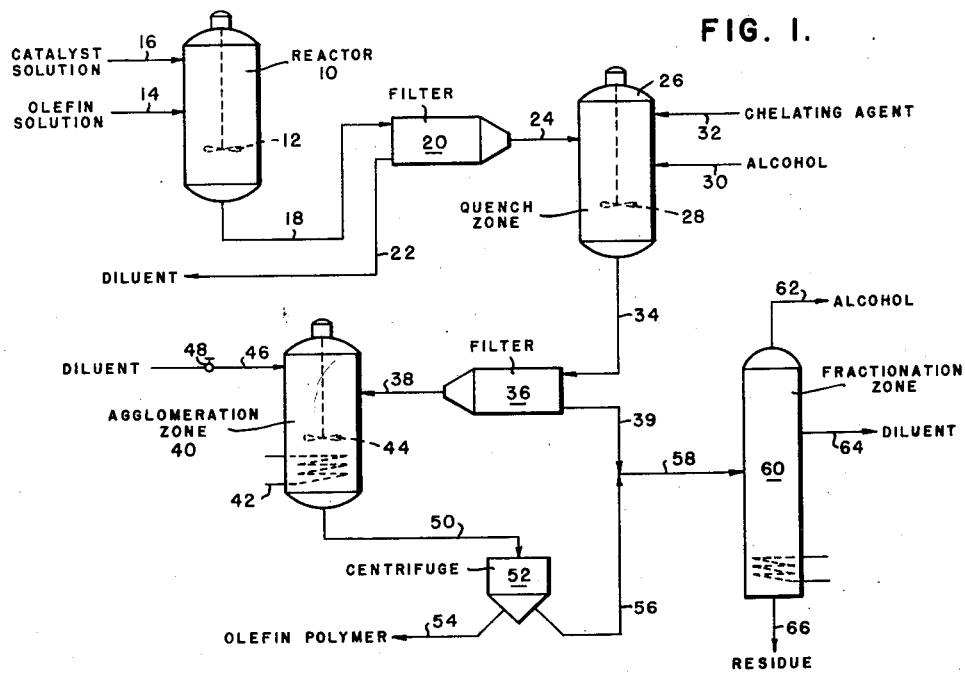

INVENTORS.
Henry G. Schutze,
Irving Liebson,
Delos E. Bown,
ATTORNEY.

United States Patent Office 3,020,268
Patented Feb. 6, 1962

3,020,268
SLURRY RESOLUTION
Henry G. Schutze, Irving Leibson, and Delos E. Bown, Baytown, Tex., assignors, by mesne assignments, to Esso Research and Engineering Company, Elizabeth, N.J., a corporation of Delaware
Filed Oct. 21, 1957, Ser. No. 691,513
7 Claims. (Cl. 260—93.7)

This invention relates to a process for recovering initially finely divided high surface area particles of an alpha olefin polymer from a liquid organic medium in the form of easily recoverable low surface area polymer agglomerates. More particularly, the present invention is directed to a method for treating a slurry of high surface area, finely divided alpha olefin polymer particles so as to form an agglomerate from the finely divided particles to thereby facilitate resolution of the slurry into solid and liquid components and to improve the physical properties of the recovered polymer.

Alpha olefins such as $C_2$ to $C_6$ olefins including ethylene, propylene, butene-1, heptene-1, hexene-1, and mixtures thereof may be polymerized to high molecular weight polymers by a non-polar diluent polymerization process conducted under moderate reaction conditions in the presence of a chain transfer agent-activated partially reduced compound of an amphoteric heavy metal. The polymer precipitates from liquid components of the reaction medium in the form of finely divided high surface area particles characterized by high surface areas in excess of about 10 m.$^2$/g. and particle diameters of less than about 1000 A. Thus, polypropylene particles will normally have a surface area in excess of 30 m.$^2$/g. and an average particle size of less than about 200 A. Large quantities of the liquid components of the reaction medium are adsorbed in the polymer particles and, as a consequence, there is no signifiicant difference in specific gravity between the particle and the organic diluent. Therefore, gravity separation of the polymer particles presents many problems.

It has now been discovered that this problem can be overcome by a particular type of heat treatment of the finely divided polymer particles. Thus, in accordance with the present invention the polymer particles, after being treated for catalyst deactivation, are heated to a temperature from about 20° to about 50° C. below the polymer melting point while slurried in a liquid medium, the heat treatment being conducted at a pressure within the range of about 0 to 100 p.s.i.g. The polymer particles are maintained at the desired temperature and pressure for a period of time sufficient to selectively soften the surface of the particles and to agglomerate the particles to an extent sufficient to permit facile gravity separation of the agglomerates from the liquid medium on cooling of the slurry. Thereafter, the slurry is preferably cooled to a normal processing temperature, such as room temperature, in order to facilitate further processing and in order to prevent more than a minimized amount of polymer from being dissolved in the liquid medium. The agglomeration treatment is conducted after deactivation of catalyst components associated with the initial polymer particles and preferably is conducted prior to exposure of the polymer particles to a contaminating atmosphere (e.g., air).

Figure 2:
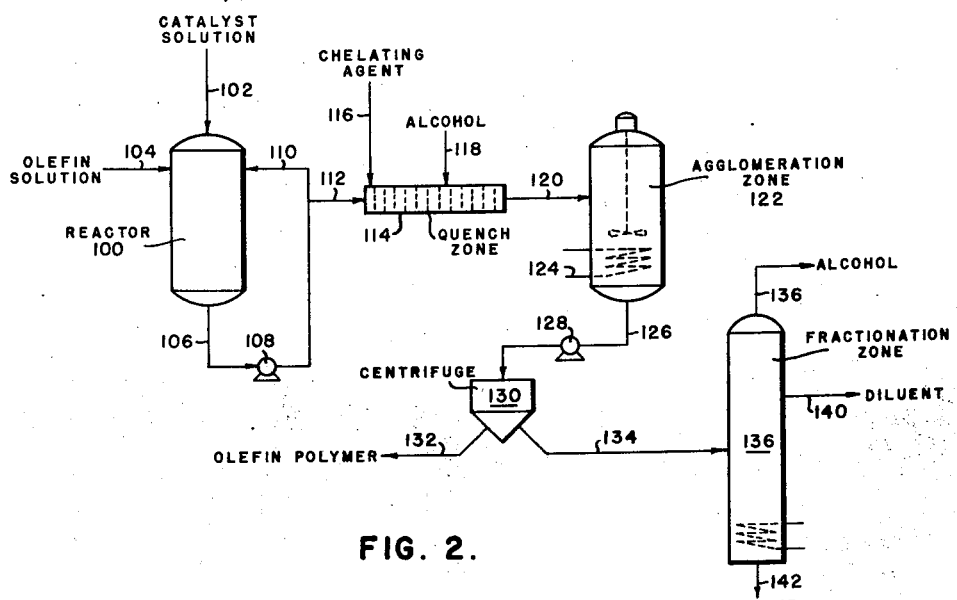

The invention will be further illustrated with respect to the accompanying drawings wherein:

FIG. 1 is a schematic flow sheet illustrating one manner in which the process of the present invention may be continuously conducted; and FIG. 2 is a schematic flow sheet illustrating a preferred method for continuously practicing the process of the present invention.

Turning now to FIG. 1, there is schematically shown a reactor 10 provided with suitable agitating means such as a propeller type agitator 12. A solution of a $C_2$ to $C_6$ alpha olefin in a non-polar, non-olefinic diluent is charged to the reactor 10 by way of a charge line 14 and a solution in the diluent of a catalyst composition is charged to the reactor 10 by way of a charge line 16.

A wide class of diluents may be employed including, for example, aromatic hydrocarbons, aliphatic hydrocarbons, chlorinated hydrocarbons, etc. including, for example, liquefiable normally gaseous hydrocarbons such as propane, butane, and mixtures thereof; normally liquid aliphatic hydrocarbons such as pentane, isopentane, n-hexane, n-heptane, n-octane, n-nonane, n-decane and mixtures thereof, etc.; benzene, xylenes, chlorobenzene, etc.

The catalyst may be any of the partially reduced chain transfer agent-activated compounds of partially amphoteric metals known to those skilled in the art, including, for example, partially reduced compounds of a metal of groups IV–B, V–B, VI–B, and VIII of the periodic system of elements. Examples of such elements include titanium, zirconium, hafnium, thorium, uranium, chromium, iron, tungsten, etc. Examples of suitable compounds susceptible to partial reduction include halides such as chlorides and bromides; oxyhalides such as oxychlorides; complex halides such as complex fluorides; freshly precipitated oxides or hydroxides, etc. Such compounds should be reduced by at least one but not more than two valence states.

The partial reduction products of such amphoteric metal compounds may be prepared by reacting the amphoteric compound with a chemical reducing agent such as an aluminum alkyl, an aluminum hydride, etc. in the presence of an organic diluent of the type set forth above. Representative aluminum compounds include, for example, dialkyl and trialkyl aluminum halides such as aluminum triethyl, diethyl aluminum chloride, etc.; di- and triaryl aluminum halides such as aluminum diphenyl chloride, aluminum triphenyl, etc.; hydrides such as aluminum hydride, ethyl aluminum hydride, diethyl aluminum hydride, etc. The amphoteric metal compound may be partially reduced by other conventional techniques such as thermal reduction in the presence of hydrogen, etc. and then mixed with a chain transfer agent such as an aluminum alkyl in the presence of the organic diluent. Such catalysts are frequently referred to as "Ziegler" catalysts. As another example, a solution of the amphoteric metal compound in a liquid aliphatic hydrocarbon may be exposed to ionizing radiation to thereby partially reduce and activate the amphoteric metal compound. Such a process is disclosed and claimed in copending Schutze application S.N. 538,518, filed October 4, 1955, and now abandoned. The catalysts prepared in this fashion do not need to be activated with chemical chain transfer agents. However, they promote alpha olefin polymerization in the same manner.

The amount of diluent charged to the reaction zone 10 by way of the charge lines 14 and 16 is preferably such that the liquid polymerization medium will contain from about 0.05 to 10 weight percent of partially reduced amphoteric metal compound.

The polymerization conditions employed within the reaction zone 10 may suitably include a temperature within the range from about 10° to about 100° C. (preferably about 40° to 70° C.), and a pressure within the range of about 0 to 300 p.s.i.g. (preferably about 20 to 100 p.s.i.g.). The residence time within the reaction zone 10 may be within the range of 0.5 to 6 hours, preferably from about 1 to 3 hours. The polymer product should preferably represent about 5 to 20 percent and more preferably about 10 to 15 percent by weight of the total polymerization reaction mixture. As indicated, the polymer particles within the reactor 10 will be present in the form of high surface area finely divided particles such as particles having a diameter of less than about 1000 A. and surface areas in excess of about 10 m.$^2$/g.

A stream of the thus-prepared slurry is withdrawn from the reactor 10 by way of a discharge line 18 leading to a suitable filtration zone 20 wherein at least a major amount of the diluent is separated from the slurry to provide a concentrated polymer fraction. The withdrawn diluent is discharged from the filter 20 by way of a discharge line 22. The concentrated polymer fraction is discharged from the filter 20 by way of a line 24 leading to a quench zone 26 provided with suitable agitating means such as a propeller type agitator 28.

Within the quench zone 26 the polymer particles which contain occluded catalyst components are treated with a suitable polar quenching compound such as a $C_1$ to $C_4$ alcohol introduced by way of a line 30 in order to deactivate and substantially completely solubilize occluded catalyst components. A preferred quenching agent is isopropyl alcohol. Generally, from about 50 to 400 (e.g., 100 to 300) parts by weight of quenching agent per 100 parts of polymer are employed. In addition, it is generally desirable to introduce a suitable chelating agent into the quench zone 26 by way of a line 32. Particularly desirable chelating agents include 1,3-dicarbonyl compounds such as diketones, keto esters, and keto acids. Examples of suitable chelating agents include acetyl acetone and ethyl acetyl acetonate. Although the chelating agent may be employed by itself in the quench zone, it is generally preferable, as indicated, to employ a predominant amount of alcoholic quench medium and a minor amount of chelating agent. In this situation, from about 0.1 to 50 weight percent (e.g., 1 to 10 weight percent) of chelating agent is introduced into the quench zone 26. The polyolefin polymer particles are preferably quenched in the wash zone 26 under conditions including a temperature within the range of about 100° to 300° F. (preferably 100° to 200° F.) for about 5 to 120 minutes (preferably about 30 to 60 minutes). A temperature of about 100° to 300° F. corresponds to a temperature of about 38° to about 150° C. and a temperature range of about 100° to 200° F. corresponds to a temperature within the range of about 38° to 98° C.

The quenched polymer particles are withdrawn from the zone 26 by way of a discharge line 34 leading to a filtration zone 36 wherein at least a major amount of the quenching compounds are removed by filtration. The liquid components removed from the slurry in the filtration zone 36 are discharged therefrom by way of a line 38 for processing in a manner to be described.

In accordance with conventional practice, the polymer particles from the filtration zone 36 would be discharged therefrom by way of a line 38 leading to a drying zone (not shown) for heat treatment in order to remove adsorbed quenching compound.

In accordance with the present invention, the concentrated alcoholic polymer fraction is discharged by way of a line 38 into an agglomeration zone 40 provided with suitable heating means such as, for example, a steam coil 42 and suitable agitating means such as, for example, a propeller type agitator 44.

A non-polar, non-olefinic organic diluent of the type employed in the reaction zone 10 or a mixture of such diluent with a $C_1$ to $C_4$ aliphatic alcohol is introduced into the agglomeration zone 40 by way of a charge line 46 controlled by a valve 48. The diluent may be different from the diluent employed in the reaction zone 10 or may be the same as the diluent employed in the reaction zone 10.

The polymer particles are heated in the agglomeration zone 40 to a temperature within about 20° to 50° C. below the normal melting point of the polymer at a pressure within the range of 0 to 100 p.s.i.g. sufficient to render the polymer particles sparingly soluble in the non-olefinic diluent. The temperature and pressure conditions are maintained for a period of time (preferably about 15 to 60 minutes) sufficient to agglomerate the polymer particles. The particles, when agglomerated in accordance with the present invention, will have a specific gravity which is in excess of the specific gravity of the initial polymer particles (e.g., about 120 to 200 percent greater), will have a low surface area of substantially less than about 1 m.$^2$/g., will have an agglomerate size of not less than about 1 micron and preferably within the range of about 10 to 1000 microns.

The particular organic diluent to be introduced into the agglomeration zone 40 and the particular alcohol added thereto by way of the line 46, if any, should be selected so that sparing solubility will be achieved under the temperature and pressure conditions to be employed. This will be hereinafter explained in greater detail.

The slurry of agglomerated polymer particles in the liquid medium is withdrawn from the agglomeration zone 40 by way of a discharge line 50 leading to a suitable separation means such as a centrifuge 52. Within the centrifuge 52 the slurry, preferably after being cooled to room temperature, is resolved into an olefin polymer filter cake fraction discharged by way of the line 54 and a filtrate fraction discharged by way of a line 56. The polymer discharged by way of a line 54 will normally contain less than about 10 weight percent of liquids derived from the agglomeration zone 40 and may therefore be dried with ease by moderate heat treatment. In many instances the polymer product discharged by way of the line 54 will be in a physical condition such that it may be charged directly to an extruder without preliminary drying.

Filtrate withdrawn from the filtration zone 36 by way of the line 39 and filtrate withdrawn from the zone 52 by way of the line 56 may be charged to a line 58 leading to a suitable fractionation zone 60. Within fractionation zone 60 (which may comprise one or a plurality of fractionation towers) the liquid components of the filtrates may be resolved into a quenching agent fraction discharged by way of a line 62, a non-polar, non-olefinic fraction discharged by way of a line 64, and a residue fraction discharged by way of a line 66.

A preferred manner for practicing the process of the present invention is schematically illustrated in FIG. 2. In accordance with FIG. 2, there is provided a reactor 100 provided with an inlet line 102 for the continuous admission of a solution of catalyst composition and an inlet line 104 for the continuous addition of a solution of the olefin to be polymerized. Agitation of the reaction medium may be accomplished mechanically as schematically illustrated in FIG. 1 or, more preferably, by continuously recycling a stream of polymerization medium withdrawn by a bottoms discharge line 106 through a suitable pump 108 and thence to the top of the reactor 100 by way of a return line 110.

In accordance with this showing, a portion of the polymer slurry is continuously withdrawn from the recycle line 110 by way of a branch line 112 leading to a quench zone 114 of any suitable construction. The quench zone 114 may comprise a suitable incorporator such as the baffle plate incorporator schematically illustrated in the drawing. In flowing through the quench zone 114, the withdrawn slurry is treated with a suitable quenching medium for deactivating the catalyst. Thus, for example, a chelating agent in an amount within the range of about 1 to 10 weight percent, based on the polymer content of the slurry, may be introduced to the quench zone 114 by way of a charge line 116 and, downstream from the charge line 116, a $C_1$ to $C_6$ alcohol may be added by way of a charge line 118. In accordance with this form of the present invention, the amount of alcohol to be employed may be substantially less than the amount required in the processing sequence of FIG. 1. Thus, in situations wherein the organic diluent is n-decane, as little as about 5 volume percent of methanol, based on the total content of the slurry, may be employed with satisfactory results. In general, it will be preferable to employ from about 20 to 100 volume percent of alcohol. As a consequence of this treatment, the catalyst components of the slurry are substantially completely deactivated on discharge of the slurry stream from the quench zone 114 by way of a discharge line 120 leading to an agglomeration zone 122 of any suitable construction. Within the agglomeration zone 122 the slurry is heated to a temperature within about 20° to 50° C. below the normal melting point of the polymer at a pressure within the range of about 0 to 100 p.s.i.g. such to render the particles sparingly soluble in the diluent. The slurry is maintained in the agglomeration zone 122 for a residence time within the range of 15 to 60 minutes sufficient to provide a slurry of readily filterable agglomeration polymer particles in the liquid component. Heat may be supplied to the agglomeration zone 122 by any suitable means such as, for example, a steam coil 124.

A stream of agglomerated slurry is continuously withdrawn from the zone 122 by way of a discharge line 126 provided with a pump 128 leading to a polymer separation zone 130 provided with suitable means such as a basket type centrifuge for separating the polymer particles from the liquid components of the slurry.

Within the separation zone 130 the slurry is resolved into an olefin polymer fraction discharged by way of a line 132 and a liquid fraction discharged by way of a line 134 leading to a fractionation zone 136 of any suitable construction. The liquid components of the slurry may be fractionated in the zone 136 to provide an alcohol fraction discharged by way of the line 138, a hydrocarbon diluent fraction discharged by the line 140 and a residue fraction discharged by way of the line 142.

The invention will be further illustrated by the following specific examples which are given by way of illustration and not as limitations on the scope of this invention.

*Example I*

A propylene polymer having a melting point of about 165° C. was prepared by polymerizing propylene with diethyl aluminum chloride-activated titanium trichloride employing n-heptane as a diluent. As a consequence, a slurry of finely divided polypropylene particles having a surface area of about 30 m.$^2$/g. and an average particle diameter of less than about 200 A. was prepared. The slurry was filtered under an inert atmosphere to remove the hydrocarbon diluent as completely as possible and to provide a concentrated polymer fraction. The concentrated polymer fraction was then treated with 0.5 mol percent of acetyl acetonate and 4 volumes of isopropyl alcohol at a temperature of about 70° C. for about ½ hour in order to substantially completely deactivate the catalyst components remaining in the concentrated polymer fraction. Thereafter, the slurry of polymer particles in the alcoholic medium was separated by filtration to remove as much of the alcoholic medium as possible. The polymer fraction, after filtration, felt dry to the touch but contained about 36 weight percent polypropylene and about 64 weight percent of isopropyl alcohol.

260 grams of n-decane were added to 100 grams of the thus-obtained mixture of polypropylene and adsorbed isopropyl alcohol to provide a decane slurry which was heated to a temperature of about 108° C. and then allowed to cool to room temperature. Rapid agglomeration of the polymer particles occurred, the agglomerates having a surface area of less than about 1 m.$^2$/g. After being cooled, the liquid components of the agglomerated polymer slurry were readily removed by filtration. About 85 percent of the isopropanol initially present in the charge was recovered in the filtrate, together with substantially all of the n-decane. The remaining alcohol was removed from the filtered polymer particles by drying at a temperature of about 100° C.

When the agglomeration step was repeated utilizing n-heptane in place of n-decane, the maximum temperature to which the slurry could be heated was about 85° C. because of the volatility of the n-heptane. The physical characteristics of the polymer particles were not altered by this treatment.

When the agglomeration step was repeated utilizing a xylenes solvent in place of n-decane and the resultant slurry was heated to a temperature of about 120° C., the polypropylene was solubilized in the xylenes to an extent sufficient to form a non-filterable translucent gel.

When the agglomeration step was repeated and n-butanol was substituted for the n-heptane, there was again no agglomeration of the polymer particles although the polymer slurry was heated to a temperature of about 112° C.

*Example II*

About 54 grams of the polypropylene-isopropyl alcohol fraction obtained in Example I were added to a mixture of about 90 grams of isopentane with 56 grams of n-butanol (about 1.5 mols of isopentane per mol of butanol) and the resultant slurry was charged to an autoclave provided with an agitator. The slurry was heated to a temperature of about 117° C. and then allowed to cool to room temperature. Agglomeration of the polymer particles occurred, the agglomerates having a surface area of less than about 1 m.$^2$/g. This slurry could be easily resolved into a polymer fraction substantially completely free of liquid components by filtration.

When Example II is repeated utilizing a mixture of about 90 grams of xylenes solvent with about 56 grams of methanol (about 2.2 mols of methanol per mol of xylenes) and heating to 150° C., the polymer particles were readily agglomerated into easily filterable agglomerates of a surface area of less than about 1 m.$^2$/g. However, at 125° C. no agglomeration occurred.

As adduced from the foregoing, successful agglomeration of the polymer particles may be achieved by the proper selection of non-olefinic diluent and alcohol, the choice being determined, in part, by the temperature and pressure conditions to be employed in the agglomeration step. That is to say, the diluent composition and concentration, alcohol content and composition, agglomeration temperature, and agglomeration pressure are all interrelated. However, this presents no serious problem in that the precise temperature and pressure conditions to be employed for a particular non-olefinic diluent and a particular alcohol may readily be determined by a few simple experiments performed, for example, in the manner of Example I.

Having thus described our invention, what is claimed is:

1. In a method wherein a $C_2$ to $C_6$ alpha olefin is polymerized in the presence of a non-olefinic, non-polar organic diluent containing a catalytic amount of a reduced compound of a metal of the group consisting of groups IV–B, V–B, VI–B, and VIII of the periodic system of elements under conditions to form a polymer of said olefin melting above about 100° C. whereby there is formed a first slurry of polymer particles in said diluent, said particles having surface areas in excess of about 10 m.$^2$/g., particle diameters of less than about 1,000 A. and a particle specific gravity about the same as the specific gravity of said diluent, the improvement which comprises quenching said first slurry with a $C_1$–$C_4$ alcohol to deactivate said catalyst, thereafter, prior to exposure of said particles to a polar atmosphere, separating said particles from said first slurry, slurrying said separated particles in a liquid medium comprising at least one $C_1$ to $C_4$ alcohol and a non-polar, non-olefinic organic diluent to provide a second slurry, heating said second slurry to a temperature of about 20 to about 50° C. below the melting point of said polymer at a pressure within the range of about 0 to 100 p.s.i.g., sufficient to render said polymer sparingly soluble in said diluent, said second slurry being maintained under said temperature and pressure conditions for a period of time sufficient to selectively soften the surface of said particles and to agglomerate said particles to an extent sufficient to increase the specific gravity of said particles by about 120 to 200 percent whereby agglomerated particles are provided having surface areas of less than about 1 m.$^2$/g. and particle diameters of not less than 1 micron, cooling said second slurry of agglomerated particles and then separating said thus agglomerated particles from said liquid medium.

2. A method as in claim 1 wherein the olefin is propylene.

3. In a method wherein a $C_2$ to $C_6$ alpha olefin is polymerized in the presence of a non-olefinic, non-polar organic diluent containing a catalytic amount of a reduced compound of a metal of the group consisting of groups IV–B, V–B, VI–B, and VIII of the periodic system of elements under conditions to form a polymer of said olefin melting above about 100° C. whereby there is formed a first slurry of polymer particles in said diluent, said particles having surface areas in excess of about 10 m.$^2$/g., particle diameters of less than about 1,000 A. and a particle specific gravity about the same as the specific gravity of said diluent, the improvement which comprises removing at least a major portion of said diluent from said first slurry to provide a second concentrated slurry, quenching said second concentrated slurry with an amount of $C_1$ to $C_4$ alkyl alcohol sufficient to deactivate said catalyst whereby a third alcoholic slurry of polymer particles is formed, removing at least a major amount of the liquid portion of said third alcoholic slurry to provide an alcoholic polymer concentrate, slurrying said alcoholic concentrate in a liquid medium selected from the class consisting of non-polar, non-olefinic organic solvents and mixtures of said solvents with $C_1$ to $C_4$ alkyl alcohols to provide a fourth slurry, thereafter, prior to exposure of said particles to a polar atmosphere, heating said fourth slurry to a temperature of about 20 to about 50° C. below the melting point of said polymer at a pressure within the range of about 0 to 100 p.s.i.g., sufficient to render said polymer sparingly soluble in said diluent, said slurry being maintained under said temperature and pressure conditions for a period of time sufficient to selectively soften the surface of said particles and to agglomerate said particles to an extent sufficient to increase the specific gravity of said particles by about 120 to 200 percent whereby agglomerated particles are provided having surface areas of less than about 1 m.$^2$/g. and particle diameters of not less than 1 micron, cooling said slurry of agglomerated particles and then separating said thus agglomerated particles from said liquid medium.

4. A method as in claim 3 wherein the liquid medium is a mixture of n-butanol with about 1.5 mols of isopentane per mol of butanol and wherein said fourth slurry is heated to a temperature of about 117° C. during said agglomerating step.

5. A method as in claim 3 wherein the liquid medium is a mixture of xylenes of about 2.2 mols of methanol per mol of xylene and wherein said fourth slurry is heated to a temperature of about 150° C. during said agglomeration step.

6. In a method wherein a $C_2$ to $C_6$ alpha olefin is polymerized in the presence of a non-olefinic, non-polar organic diluent containing a catalytic amount of a reduced compound of a metal of the group consisting of groups IV–B, V–B, VI–B, and VIII of the periodic system of elements under polymerization conditions including a temperature of about 10° to 100° C., a pressure of about 300 p.s.i.g. and an average residence time of about 0.5 to about 6 hours to form a polymer of said olefin melting above about 100° C. to provide a first slurry of 5 to 20 weight percent based on the total polymerization reaction mixture of polymer particles in said diluent, said particles having surface areas in excess of about 10 m.$^2$/g., particle diameters of less than about 1,000 A. and a particle specific gravity about the same as the specific gravity of said diluent, the improvement which comprises removing at least a major portion of said diluent from said first slurry to provide a second concentrated slurry, quenching said second concentrated slurry with about 50 to 400 parts by weight of a $C_1$ to $C_4$ alkyl alcohol per 100 parts by weight of a polymer for about 5 to 120 minutes at a temperature of about 38° to 150° C. to deactivate said catalyst whereby a third alcoholic slurry of polymer particles is formed, removing at least a major amount of the liquid portion of said third alcoholic slurry to provide an alcoholic polymer concentrate, slurrying said alcoholic concentrate in a liquid medium selected from the class consisting of non-polar, non-olefinic organic solvents and mixtures of said solvents with $C_1$ to $C_4$ alkyl alcohols to provide a fourth slurry, thereafter, prior to exposure of said particles to a polar atmosphere, heating said fourth slurry to a temperature of about 20 to about 50° C. below the melting point of said polymer at a pressure within the range of about 0 to 100 p.s.i.g. for about 15 to 60 minutes, sufficient to render said polymer sparingly soluble in said diluent, said slurry being maintained under said temperature and pressure conditions for a period of time sufficient to selectively soften the surface of said particles and to agglomerate said particles to an extent sufficient to increase the specific gravity of said particles by about 120 to 200 percent whereby agglomerated particles are provided having surface areas of less than about 1 m.$^2$/g. and particle diameters of not less than 1 micron, cooling said slurry of agglomerated particles and then separating said thus agglomerated particles from said liquid medium.

7. In a method wherein a $C_2$ to $C_6$ alpha olefin is polymerized in the presence of a non-olefinic, non-polar organic diluent containing a catalytic amount of a reduced compound of a metal of the group consisting of groups IV–B, V–B, VI–B, and VIII of the periodic system of elements under polymerization conditions including a temperature of about 40° to 70° C., a pressure of about 20 to 200 p.s.i.g. and an average residence time of about 1 to 3 hours to form a polymer of said olefin melting above about 100° C. to provide a first slurry of 10 to 15 weight percent based on the total polymerization reaction mixture of polymeric particles in said diluent, said particles having surface areas in excess of about 10 m.$^2$/g., particle diameters of less than about 1,000 A. and a particle specific gravity about the same as the specific gravity of said diluent, the improvement which comprises removing at least a major portion of said diluent from said first slurry to provide a second concentrated slurry, quenching said second concentrated slurry with about 100 to 300 parts by weight of a $C_1$ to $C_4$ alkyl alcohol per 100 parts of polymer for about 30 to 60 minutes at a temperature of about 38° to 98° C. to deactivate said catalyst whereby a third alcoholic slurry of polymer particles is formed, removing at least a major amount of the liquid portion of said third alcoholic slurry to provide an alcoholic polymer concentrate, slurrying said alcoholic concentrate in a liquid medium selected from the class consisting of non-polar, non-olefinic organic solvents and mixtures of said solvents with $C_1$ to $C_4$ alkyl alcohols to provide a fourth slurry, thereafter, prior to exposure of said particles to a polar atmosphere, heating said fourth slurry to a temperature of about 20° to about 50° C. below the melting point of said polymer at a pressure within the range of about 0 to 100 p.s.i.g. for about 15 to 60 minutes, sufficient to render said polymer sparingly soluble in said diluent, said slurry being maintained under said temperature and pressure conditions for a period of time sufficient to selectively soften the surface of said particles and to agglomerate said particles to an extent sufficient to increase the specific gravity of said particles by about 120 to 200 percent whereby agglomerated particles are provided having surface areas of less than about 1 m.$^2$/g. and particle diameters of not less than 1 micron, cooling said slurry of agglomerated particles and then separating said thus agglomerated particles from said liquid medium.

References Cited in the file of this patent

UNITED STATES PATENTS

| | | |
|---|---|---|
| 2,386,674 | Flint et al. | Oct. 9, 1945 |
| 2,834,768 | Friedlander | May 13, 1958 |
| 2,838,477 | Roelen et al. | June 10, 1958 |
| 2,845,414 | Schutze | July 29, 1958 |
| 2,857,369 | Johnson | Oct. 21, 1958 |
| 2,870,113 | Jones | Jan. 20, 1959 |
| 2,886,561 | Reynolds et al. | May 12, 1959 |
| 2,916,478 | Kittleson et al. | Dec. 8, 1959 |
| 2,921,933 | McKinnis et al. | Jan. 19, 1960 |

FOREIGN PATENTS

| | | |
|---|---|---|
| 526,101 | Italy | May 14, 1955 |
| 533,362 | Belgium | May 16, 1955 |
| 538,782 | Belgium | Dec. 6, 1955 |